United States Patent
Choi et al.

(10) Patent No.: US 9,902,619 B2
(45) Date of Patent: Feb. 27, 2018

(54) GRAPHENE SHELL AND PROCESS OF PREPARING THE SAME

(71) Applicant: SAMSUNG ELECTRONICS CO., LTD., Suwon-si, Gyeonggi-do (KR)

(72) Inventors: Jae-young Choi, Suwon-si (KR); Hyeon-Jin Shin, Suwon-si (KR); Seon-mi Yoon, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/246,364

(22) Filed: Apr. 7, 2014

(65) Prior Publication Data

US 2014/0220348 A1 Aug. 7, 2014

Related U.S. Application Data

(60) Division of application No. 13/308,762, filed on Dec. 1, 2011, now Pat. No. 8,734,900, which is a (Continued)

(30) Foreign Application Priority Data

Sep. 12, 2007 (KR) .................. 10-2007-0092650

(51) Int. Cl.
*B32B 5/16* (2006.01)
*C01B 3/00* (2006.01)
(Continued)

(52) U.S. Cl.
CPC .......... *C01B 31/0446* (2013.01); *B82Y 30/00* (2013.01); *B82Y 40/00* (2013.01); *C01B 3/0015* (2013.01); *C01B 32/184* (2017.08);

*G02B 6/032* (2013.01); *C01B 2204/02* (2013.01); *C01B 2204/04* (2013.01); *Y02E 60/328* (2013.01); *Y10T 428/2982* (2015.01); *Y10T 428/2991* (2015.01)

(58) Field of Classification Search
CPC ......... Y10T 428/2982; Y10T 428/2992; C01B 31/0293; B82Y 30/00; B82Y 40/00
USPC .................................................. 428/402, 403
See application file for complete search history.

(56) References Cited

U.S. PATENT DOCUMENTS 5,994,476 A 11/1999 Shin et al.
6,602,932 B2 8/2003 Feldheim et al.
(Continued)

FOREIGN PATENT DOCUMENTS

| KR | 20030071352 A | 9/2003 |
| KR | 20040025569 A | 3/2004 |
| KR | 1020070051839 A | 5/2007 |

OTHER PUBLICATIONS

Yu et al., Preparation and magnetic behavior of carbon-encapsulated cobalt and nickel nanoparticles from starch, Chemical Engineering Research and Design 86 (2008) 904-908.*

(Continued)

*Primary Examiner* — Holly Le
(74) *Attorney, Agent, or Firm* — Cantor Colburn LLP

(57) ABSTRACT

Provided is a process for economically preparing a graphene shell having a desired configuration which is applicable in various fields wherein in the process the thickness of the graphene shell can be controlled, and a graphene shell prepared by the process.

13 Claims, 7 Drawing Sheets

Related U.S. Application Data continuation of application No. 12/132,319, filed on Jun. 3, 2008, now Pat. No. 8,075,950.

(51) Int. Cl.

| | |
|---|---|
| *C01B 31/04* | (2006.01) |
| *B82Y 30/00* | (2011.01) |
| *B82Y 40/00* | (2011.01) |
| *G02B 6/032* | (2006.01) |
| *C01B 32/184* | (2017.01) |

(56) References Cited

U.S. PATENT DOCUMENTS

| | | |
|---|---|---|
| 6,716,409 B2 | 4/2004 | Hafner et al. |
| 7,071,258 B1 | 7/2006 | Jang et al. |
| 7,387,813 B2 | 6/2008 | Kumar et al. |
| 7,731,930 B2 | 6/2010 | Taki et al. |
| 8,075,950 B2 | 12/2011 | Choi et al. |
| 8,303,836 B2 | 11/2012 | Araujo Moreira et al. |
| 2002/0127162 A1 | 9/2002 | Smalley et al. |
| 2003/0098640 A1 | 5/2003 | Kishi et al. |
| 2004/0110005 A1 | 6/2004 | Choi et al. |
| 2005/0099111 A1 | 5/2005 | Hirakawa et al. |
| 2005/0271574 A1 | 12/2005 | Jang et al. |
| 2007/0092716 A1 | 4/2007 | Guo et al. |
| 2009/0068471 A1 | 3/2009 | Choi et al. |
| 2009/0082474 A1* | 3/2009 | Zhang ............... B82Y 30/00 516/32 |
| 2009/0110627 A1 | 4/2009 | Choi et al. |
| 2013/0134361 A1 | 5/2013 | Lee et al. |

OTHER PUBLICATIONS

Victor et al., Synthesis of carbon-silica shell-core hybrid structures and carbon nanoshells by a template method, Carbon 44 (2006) 1581-1616.*

Katcho et al, Carbon hollow nanospheres from chlorination of ferrocene, Chem. Mater. 2007, 19, 2304-2309.*

Qiu et al., High Purity single-wall carbon nanotubes synthesized from coal by arc discharge, Carbon 41 (2003) 2159-2179.*

Teng et al, Using Diamond as a metastable phase carbon source to facilitate the synthesis of graphite encapsulated metal (GEM) nanoparticles by an arc-discharge method, J. of Alloys and Compounds 434-435 (2007) 678-681—Available online Oct. 2006.*

Sunny et al, Synthesis and properties of highly stable nickel/carbon core/shell nanostructures, CArbon 48 (2010) 1643-1651.*

Korean Office Action for Korean Patent Application No. 10-2007-0092650 dated Feb. 24, 2014 with English Translation.

PCT International Search Report for Application No. PCT/KR2008/004552 dated Feb. 9, 2009.

Shana Leonard, "Graphene gives gold nanoparticles some stability", Medical Product Manufacturing News, 2009.

Su et al., "Blowing Carbon Nanotubes to Carbon Nanobulbs", AIP Conference Proceedings, 723, 2004, pp. 32-1-32-4.

\* cited by examiner (a) SPHERE (601)

(b) CYLINDER (602)

(603)

(c) POLYHEDRON (604)

(605)

(606)

GRAPHENE SHELL AND PROCESS OF PREPARING THE SAME

This application is divisional of U.S. patent application Ser. No. 13/308,762, filed on Dec. 1, 2011, which is a continuation of U.S. patent application Ser. No. 12/132,319, filed on Jun. 3, 2008 and issued as U.S. Pat. No. 8,075,950, which claims priority to Korean Patent Application No. 10-2007-0092650, filed on Sep. 12, 2007, and all the benefits accruing therefrom under 35 U.S.C. 119, the contents of which are incorporated herein by reference in their entirety.

BACKGROUND OF THE INVENTION

1. Field of the Invention

The present invention relates to a graphene shell and a process of preparing the same, and more particularly, to a process of economically preparing a graphene shell which can have various three-dimensional configurations and a graphene shell prepared by the process.

2. Description of the Related Art

Graphite is a stack of two-dimensional sheets formed from a planar array of carbon atoms bonded into hexagonal structures. The individual sheets, referred to as graphene, can have properties different from those of graphite. Recently, as a result of testing properties of single-layered or several-layered graphene sheets, their beneficial properties have been revealed.

A noticeable beneficial property of graphene is that electrons flow in a graphene sheet as if they are weightless, which means that electrons flow at the velocity of light in a vacuum. In addition, an unusual half-integer quantum hall effect for both electrons and holes is observed in the graphene sheet.

The electron mobility of known graphene sheets is from about 20,000 to 50,000 $cm^2/Vs$. Also, it is advantageous to use graphene sheets since products made from graphite are inexpensive while products made from carbon nanotubes which are similar to graphene sheets are expensive due to low yields obtained during synthesis and purification processes even though the carbon nanotubes are inexpensive themselves. Single wall carbon nanotubes exhibit different metallic and semiconducting characteristics according to their chirality and diameter. Furthermore, single wall carbon nanotubes having identical semiconducting characteristics have different energy band gaps depending on their chirality and diameter. Thus, single wall carbon nanotubes must be separated from each other in order to obtain desired semiconducting or metallic characteristics. However, separating single wall carbon nanotubes is not a simple process.

It is advantageous to use graphene sheets as an alternative to single wall carbon nanotubes since a device can be easily designed to exhibit desired electrical characteristics by arranging the crystalline orientation in a desired direction since electrical characteristics of a graphene sheet are changed according to the crystalline orientation. The characteristics of the graphene sheet can be efficiently applied to carbonaceous electrical devices or carbonaceous electromagnetic devices in the future.

However, although the graphene sheet possesses such advantageous characteristics, a method of economically and reproducibly preparing a large-area graphene sheet has not yet been developed. Methods of preparing a graphene sheet are classified into a micromechanical method and a SiC thermal decomposition. According to the micromechanical method, a graphene sheet separated from graphite can be prepared on the surface of a SCOTCH™ tape (available from 3M Corporation) by attaching the tape to a graphite sample and detaching the tape. In this case, the separated graphene sheet does not include a uniform number of layers, and does not have a uniform shape of ripped portions. Furthermore, a large-area graphene sheet cannot be prepared.

In another method using silicon carbide (SiC) thermal decomposition, a SiC single crystal is heated to remove Si by decomposition of the SiC on the surface thereof, and then residual carbon C forms a graphene sheet. However, the SiC single crystal as the starting material in the SiC thermal decomposition is very expensive, and a large-area graphene sheet cannot be easily prepared.

Therefore, no simple method has yet been developed to prepare a two-dimensional graphene sheet as described above, and a method for preparing a three-dimensional graphene by bending a graphene sheet is also not known in the art.

BRIEF SUMMARY OF THE INVENTION

In an embodiment, a process of preparing a graphene shell is provided.

In another embodiment, a graphene shell having a three-dimensional configuration is also provided.

In another embodiment, a membrane, a hydrogen storage medium, an optical fiber and an electrical device each employing the graphene shell are provided.

In another embodiment, a graphene core-shell assembly including the graphene shell is provided.

In still another embodiment a process of preparing a graphene shell is provided, the process comprising forming a graphitizing catalyst in a three-dimensional form;

coating a polymer on the graphitizing catalyst; and heat-treating the resultant in an inert or reductive atmosphere to form a graphene shell.

The three-dimensional form can be selected from the group consisting of a sphere, a cylinder and a polyhedron.

The graphitizing catalyst can be at least one catalyst selected from the group consisting of Ni, Co, Fe, Pt, Au, Al, Cr, Cu, Mg, Mn, Mo, Rh, Si, Ta, Ti, W, U, V and Zr.

The polymer can be a self-assembling polymer.

The polymer can be at least one polymer selected from the group consisting of an amphiphilic polymer, a liquid crystal polymer and a conductive polymer.

The amphiphilic polymer can include: a hydrophilic group having at least one selected from the group consisting of an amino group, a hydroxyl group, a carboxyl group, a sulfate group, a sulfonate group, a phosphate group, a phosphonate group, and salts thereof; and a hydrophobic group having at lest one selected from the group consisting of a halogen atom, a C1-C30 alkyl group, a C1-C30 halogenated alkyl group, a C2-C30 alkenyl group, a C2-C30 halogenated alkenyl group, a C2-C30 alkynyl group, a C2-C30 halogenated alkynyl group, a C1-C30 alkoxy group, a C1-C30 halogenated alkoxy group, a C1-C30 hetero alkyl group, a C1-C30 halogenated hetero alkyl group, a C6-C30 aryl group, a C6-C30 halogenated aryl group, a C7-C30 arylalkyl group and a C7-C30 halogenated arylalkyl group.

The amphiphilic polymer can be at least one polymer selected from the group consisting of capric acid, lauric acid, palmitic acid, stearic acid, myristoleic acid, palmitolic acid, oleic acid, stearidonic acid, linolenic acid, capryl amine, lauryl amine, stearyl amine and oleyl amine.

The conductive polymer can be at least one polymer selected from the group consisting of polyacetylene, polypyrrole, polythiophene, polyaniline, polyfluorene, poly(3-hexylthiophene), polynaphthalene, poly(p-phenylene sulfide) and poly(p-phenylene vinylene).

The polymer can be at least one polymer selected from the group consisting of acene and its derivatives, hetero acene and its derivatives, anthracene and its derivatives, hetero anthracene and its derivatives, tetracene and its derivatives, hetero tetracene and its derivatives, pentacene and its derivatives, and hetero pentacene and its derivatives.

The polymer can include a polymerizable functional group.

The process can further include polymerizing the polymer including the polymerizable functional group before coating the polymer on the graphitizing catalyst.

The process can further include polymerizing the polymer including the polymerizable functional group after coating the polymer on the graphitizing catalyst.

The heat-treatment can be performed at a temperature of from about 400 to about 2,000° C. for about 0.1 to about 10 hours.

The process can further include separating the graphene shell by removing the graphitizing catalyst using an acid-treatment after the heat-treatment.

The thickness of the graphene shell can be controlled by adjusting the amount of the polymer coated on the graphitizing catalyst.

The heat-treatment can be performed by induction heating, radiant heat, laser, infrared radiation (IR), microwaves, plasma, ultraviolet (UV) radiation or surface plasmon heating.

The graphitizing catalyst can be selectively heated by the heat-treatment.

A three-dimensional configuration of the graphene shell can be controlled by a three-dimensional configuration of the graphitizing catalyst.

In another embodiment, there is provided a graphene shell prepared by the process.

The graphene shell can be formed of polycyclic aromatic molecules in which a plurality of carbon atoms are covalently bound to each other. The thickness of the graphene can be from about 0.1 to about 100 nm, specifically about 0.1 to about 20 nm, and more specifically about 0.1 to about 10 nm.

The three-dimensional form of the graphene shell can be selected from the group consisting of a sphere, a cylinder or a polyhedron, and a diameter of the cylindrical graphene shell can be greater than about 1 micrometer.

In another embodiment, there is provided a hydrogen storage medium and an optical fiber including the graphene shell.

In another embodiment, there is provided a graphene core-shell assembly including: a graphitizing catalyst core; and a graphene shell formed on the surface of the graphitizing catalyst core.

The graphitizing catalyst core can include a metal oxide core and a graphitizing catalyst shell.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
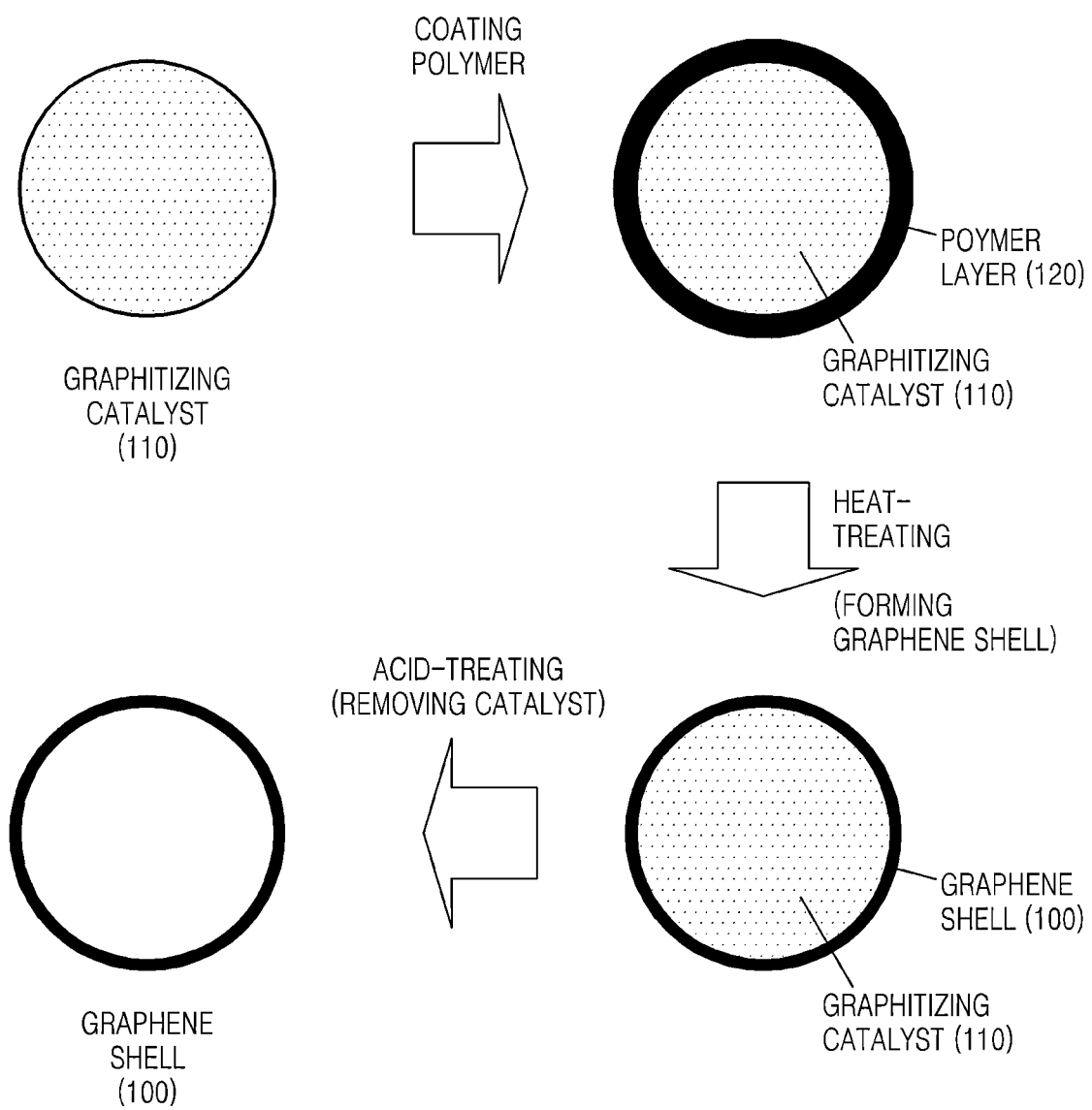
FIG. 1 schematically shows a process of preparing an exemplary graphene shell according to an embodiment.

Hereinafter, the present invention will now be described more fully with reference to the accompanying drawings, in which exemplary embodiments of the invention are shown.

It will be understood that when an element is referred to as being "on" another element, it can be directly on the other element or intervening elements can be present therebetween. In contrast, when an element is referred to as being "disposed on", "interposed between", or "formed on" another element, the elements are understood to be in at least partial contact with each other, unless otherwise specified.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, dements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with theft meaning in the context of the relevant art and the present disclosure, and will not be interpreted in an idealized or overly formal sense unless expressly so defined herein.

Disclosed is a process of economically preparing a graphene shell having a desired configuration which is applicable to various fields, wherein in the process the thickness of the graphene shell can be controlled.

Graphene as disclosed herein includes polycyclic aromatic molecules in which a plurality of carbon atoms are covalently bound to each other to form an extended fused polycyclic structure. The covalently bound carbon atoms usually form 6-membered rings as a repeating unit, but can also form 5-membered rings and/or 7-membered rings. Accordingly, in the graphene, the covalently bound carbon atoms (usually, having $sp^2$ bonds) can form a single layer. The graphene can have various structures, for example, a three-dimensional configuration such as a spherical or cylindrical configuration. The graphene having such structures is referred to herein as a graphene shell, and where the graphene has an extended two-dimensional structure, the graphene is referred to herein as a graphene sheet. While a graphene sheet typically has a planar configuration, the graphene shell has a three-dimensional configuration which is determined according to the location and amount of the 5-membered rings and/or the 7-membered rings. The graphene shell can have not just a single layer of graphene, but can also include a structure having a plurality of layers up to a total thickness of about 100 nm. Generally, the side ends (edges) of the graphene are saturated with hydrogen atoms as end or edge-terminating atoms.

The graphene shell can be formed by coating an appropriate polymer to form a layer 120 on a graphitizing catalyst 110 having a three-dimensional configuration as shown in FIG. 1, and heat-treating the resulting structure in an inert or reductive atmosphere. During heat-treatment, elements of the polymer other than carbon evaporate, and the remaining residual carbon atoms are bound to each other to form a graphene shell 100 having a three-dimensional configuration. The graphitizing catalyst can then be removed by a method such as acid treatment using an acid such as, for example, hydrochloric, hydrofluoric, sulfuric, nitric, perchloric, trifluoromethanesulfonic, trifluoroacetic, methanesulfonic, p-toluenesulfonic, acetic, formic, citric, or other suitable acid.

Graphene shells bond similarly to graphene sheets in which carbon atoms are combined in a planar hexagonal structure, but has a three-dimensional configuration which is different from the two-dimensional planar structure of the graphene sheet. That is, the graphene can maintain an appropriate angle when bent (where sufficient numbers of ring structures of 5- and/or 7-members are present in addition to the 6-membered rings) and can be formed to have a spherical, a cylindrical and polyhedral shape. The graphene shell can be hollow, and can have various desired configurations such as a sphere, cylinder or polyhedron according to its desired use. The polyhedron used herein includes a tetrahedron, a hexahedron, or the like, but does not include a cylinder.

Figure 2:
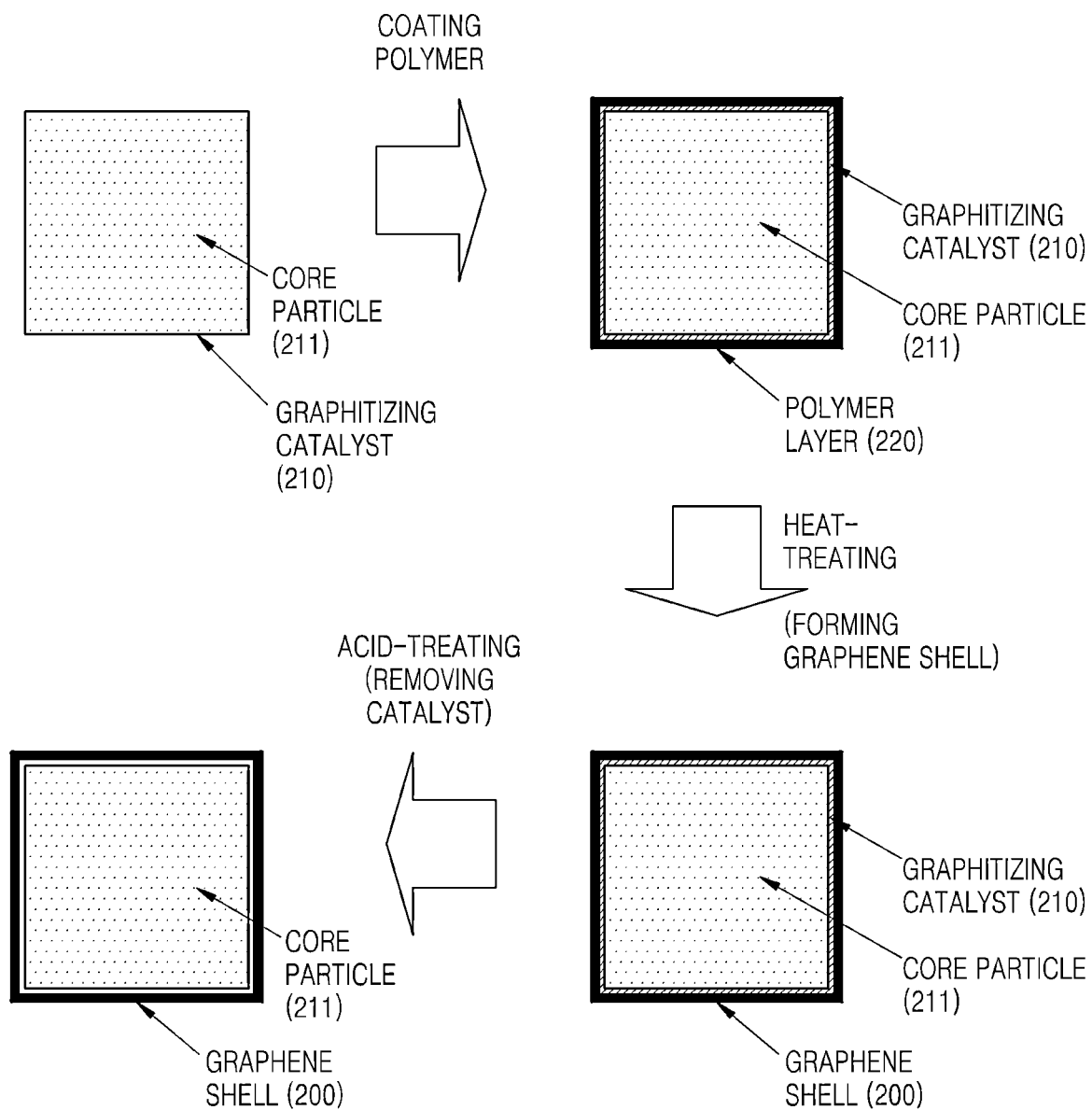
FIG. 2 schematically shows a process of preparing an exemplary graphene shell according to an embodiment.

The graphitizing catalyst used in the preparation of the graphene shell binds carbon atoms included in the polymer. For example, any suitable catalyst used to synthesize graphite, induce carbonization or prepare carbon nanotubes can be used as the graphitizing catalyst. In an embodiment, the catalyst can be derived from at least one metal selected from the group consisting of Ni, Co, Fe, Pt, Au, Al, Cr, Cu, Mg, Mn, Mo, Rh, Si, Ta, Ti, W, U, V and Zr. The graphitizing catalyst can be formed of the single metal listed above. The graphene shell can also be formed by forming a core 211 using a variety of metal oxides such as $TiO_2$, coating a graphitizing catalyst 210 as a shell having one of a variety of three-dimensional configuration, coating an appropriate polymer to form a layer 220 on the graphitizing catalyst 210, and heat-treating the resultant coated graphitizing catalyst/core particle in an inert or reductive atmosphere as shown in FIG. 2. The catalyst 210, or both the catalyst and core particle, can subsequently be removed by, for example, treating with acid.

That is, since a graphene shell having one of a variety of three-dimensional configurations can be formed by forming graphene from polymeric precursors on the surface of the graphitizing catalyst and combining the formed graphene to form a larger, contiguous graphene adapted to the shape of the graphitizing catalyst, the three-dimensional configuration of the graphene shell is controlled by the three-dimensional configuration of the graphitizing catalyst. Accordingly, a spherical powder of a graphitizing catalyst can be used in order to form a spherical graphene shell, and a cylindrical graphitizing catalyst can be used in order to form a cylindrical graphene shell, both ends of which are open.

In particular, a cylindrical graphene shell, both ends of which can be open, can be prepared by applying an inert material to both ends a cylindrical graphitizing catalyst. If the inert material is not applied, a cylindrical graphene shell, both ends of which are closed, can be prepared. The diameter of the cylindrical graphene shell can be, in an embodiment, greater than 1 micrometer, and more specifically from 1 to 100 micrometers.

Figure 3:
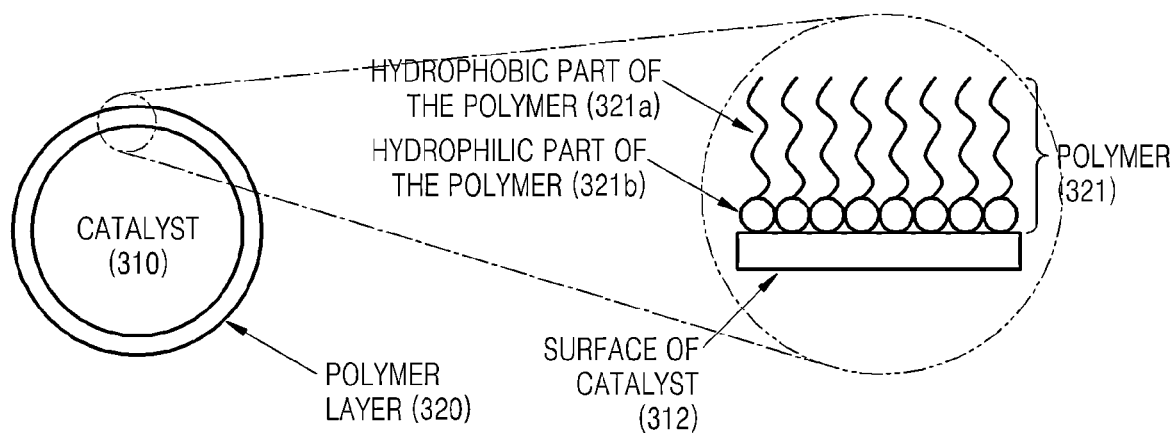
FIG. 3 schematically shows an exemplary polymer coated on a catalyst.
Figure 4:
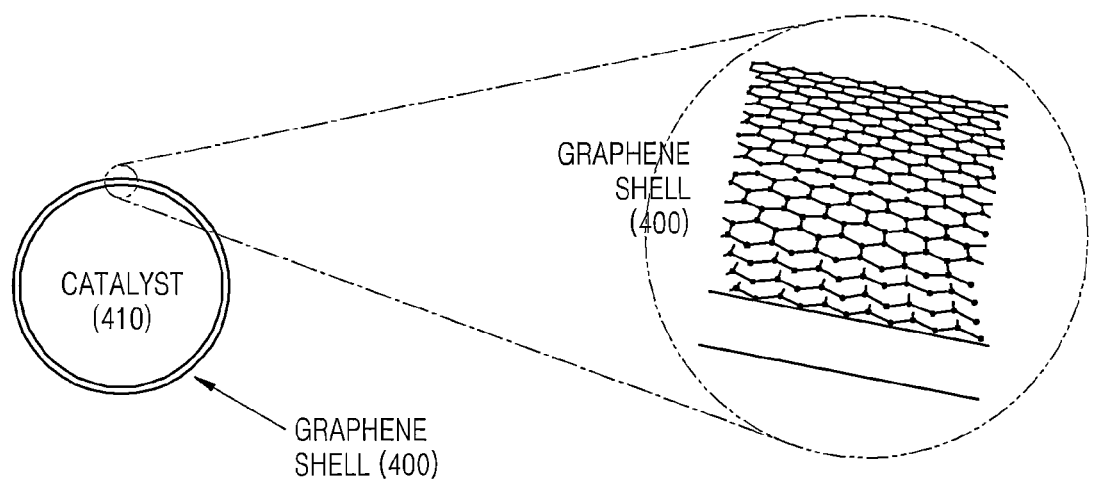
FIG. 4 schematically shows a structure of an exemplary graphene shell formed on a catalyst.

Any suitable polymer or polymer-like material including carbon can be coated on the graphitizing catalyst, and the structure and composition of the polymer are not limited. In an embodiment, a polymer that forms a dense coating can be used in order to form a dense graphitic layer. Polymers when used are typically irregularly arranged when coated on the graphitizing catalyst through spin coating, dip coating, or the like and form an irregular network structure, and thus the layer cannot have a dense structure. However, when a self-assembling polymer is used to form a layer on the graphitizing catalyst, the polymer 321 can adopt a regular arrangement, with the hydrophilic part of the polymer 321b coordinating to the surface 312 of the catalyst 310 where a hydrophobic portion of the polymer 321a extends from the surface of the graphitizing catalyst 312 as shown in FIG. 3, and thereby a graphene sheet (e.g., graphene shell 400) having a dense structure can be prepared on the surface of graphitizing catalyst 410 as shown in FIG. 4.

Any self-assembling polymer commonly used in the art can be used herein without limitation. For example, the self-assembling polymer can be at least one polymer selected from the group consisting of an amphiphilic polymer, a liquid crystal polymer, and a conductive polymer.

The amphiphilic polymer includes a hydrophilic group and a hydrophobic group, and thus can be arranged in a regular, consistent direction in a water soluble solution. For example, arranging the amphiphilic polymer by Langmuir-Blodgett techniques, dipping techniques and spin-casting techniques are possible. The amphiphilic polymer includes a hydrophilic group having at least one of an amino group, a hydroxyl group, a carboxyl group, a sulfate group, a sulfonate group, a phosphate group, a phosponate group, and salts thereof; and a hydrophobic group having at least one of a halogen, a C1-C30 alkyl group, a C1-C30 halogenated alkyl group, a C2-C30 alkenyl group, a C2-C30 halogenated alkenyl group, a C2-C30 alkynyl group, a C2-C30 halogenated alkynyl group, a C1-C30 alkoxy group, a C1-C30 halogenated alkoxy group, a C1-C30 hetero alkyl group, a C1-C30 halogenated hetero alkyl group, a C6-C30 aryl group, a C6-C30 halogenated aryl group, a C7-C30 arylalkyl group and a C7-C30 halogenated arylalkyl group. Examples of the amphiphilic polymer include capric acid, lauric acid, palmitic acid, stearic acid, myristoleic acid, palmitolic acid, oleic acid, stearidonic acid, linolenic acid, capryl amine, lauryl amine, stearyl amine and oleyl amine.

The liquid crystal polymer can also be arranged (i.e., oriented) in a direction in a liquid state. Examples of classes of liquid crystal polymers include aromatic polyimides, aromatic polyesters, and the like. The conductive polymer can be dissolved in a solvent to form a membrane and can form a crystalline structure by being aligned after the solvent is evaporated. Thus, the polymers can be aligned by dipping, spin coating, or the like. Examples of the conductive polymer include polyacetylene, polypyrrole, polythiophene, polyaniline, polyfluorene, poly(3-hexylthiophene), polynaphthalene, poly(p-phenylene sulfide) and poly(p-phenylene vinylene).

In another embodiment, a polymer that is automatically aligned in a direction when deposited from vapor state, for example, a conductive polymer formed by deposition can also be used herein. Examples of the conductive polymer include acene and its derivatives, anthracene and its derivatives, hetero anthracene (e.g., benzodithiophene and dithienothiophene) and its derivatives, tetracene and its derivatives (e.g., halogenated tetracene, tetracene derivatives having a polar substituent, tetracene-thiophene hybrid materials, rubrene and alkyl-, and alkoxy-substituted tetracene), hetero tetracene and its derivatives, pentacene and its derivatives (e.g., alkyl- and halogen-substituted pentacene, aryl-substituted pentacene, alkynyl-substituted pentacene, alkynyl-substituted alkyl and alkynyl pentacene and alkynyl-substituted pentacene ether), hetero pentacene and its derivatives and hetero acene and its derivatives.

The polymer can include at least one polymerizable functional group capable of forming a carbon-carbon double bond or triple bond. The polymerizable functional group can induce polymerization of polymers through a process of polymerization such as UV irradiation after the polymer layer is formed. Since thus formed polymer has a large molecular weight, evaporation of carbon can be prevented during the heat-treatment of the polymer.

The polymerization of the polymer can be performed before or after coating the polymer on the graphitizing catalyst. That is, when the polymerization is induced in the polymer before coating the polymer on the graphitizing catalyst, a polymer layer can be formed by transferring a polymer membrane prepared by polymerization to the graphitizing catalyst. The polymerization and transfer can be repeated several times to control the thickness of the graphene.

The polymer can be aligned on the surface of the graphitizing catalyst using various coating methods, such as Langmuir-Blodgett, dip coating, spin coating and vacuum deposition. The molecular weight of the aligned polymer, thickness of the polymer layer or the number of self-assembling polymer layers can vary depending on a desired number of layers of the graphene shell. That is, use of a polymer having a large molecular weight increases the number of layers of the graphene shell since the polymer has a large amount of carbon. As the thickness of the polymer layer increases, the number of layers of the generated graphene is increased, and thus the thickness of the graphene shell is also increased. The thickness of the graphene can be controlled by the molecular weight of the polymer.

Figure 5:
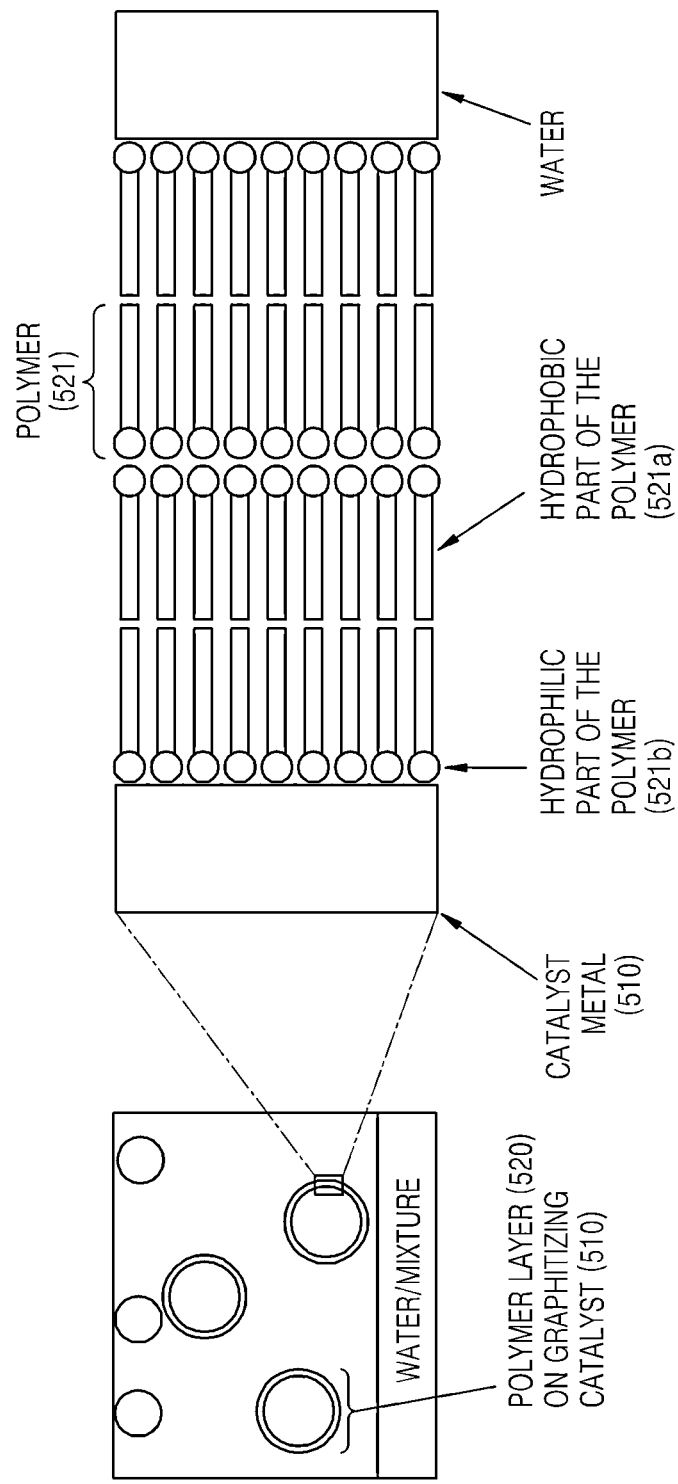
FIG. 5 schematically shows an exemplary stack of polymers having a hydrophilic part and a hydrophobic part.

In addition, the amphiphilic polymer, which is a self-assembling polymer, includes a hydrophilic part and a hydrophobic part in one molecule. As shown in FIG. 5, the hydrophilic part of the polymer combines with the hydrophilic graphitizing catalyst and thereby uniformly aligns on the catalyst layer, and the hydrophobic part of the amphiphilic polymer is aligned in the opposite direction to be combined with the hydrophilic part of another amphiphilic polymer that is not combined with the catalyst layer. When the amount of the amphiphilic polymer is sufficient, the amphiphilic polymer can be stacked on the catalyst layer by the hydrophilic-hydrophobic bonds. The stacked layers formed of a plurality of the amphiphilic polymers can form a graphene layer by heat-treatment. Thus, a graphene shell having a desired thickness can be prepared since the number of layers of the graphene can be controlled by selecting an appropriate amphiphilic polymer and adjusting the amount of the amphiphilic polymer.

The thickness of the graphene shell can vary according to its use, and can be from about 0.1 to about 100 nm, specifically from about 0.1 to about 20 nm, and more specifically from about 0.1 to about 10 nm, and still more specifically from about 0.1 to about 5 nm. The thickness of a single layered graphene is about 0.1 nm.

The polymer coated on the graphitizing catalyst is heat-treated to graphitize the polymer. The heat-treatment can be performed in an inert or reductive atmosphere in order to prevent oxidation of the elements of the polymer. The heat-treatment is desirably performed at a temperature of from about 400 to about 2,000° C. When the temperature is less than about 400° C., graphitization formation is insufficient. When the temperature is greater than about 2,000° C., carbon may be evaporated. The heat-treatment can be performed for about 0.1 to about 10 hours. When the heat-treatment time is not within the range described above, the graphitization may be insufficient or the economical efficiency can decrease.

The heat-treatment can be performed by induction heating, radiant heat, laser, infrared radiation (IR), microwaves, plasma, ultraviolet (UV) radiation, or surface plasmon heating, without limitation.

Carbon atoms in the polymer are covalently bound to each other by the heat-treatment to form, for example, a planar hexagonal structure, and thus a graphene shell can form on the graphitizing catalyst. As a result, a graphene core-shell assembly including a core formed of the graphitizing catalyst and a graphene shell is formed. Thus formed graphene core-shell assembly can be used after the graphitizing catalyst is removed by an acid-treatment, if required (See e.g., FIGS. 1 and 2).

Figure 6:
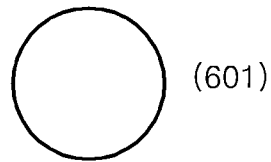
FIG. 6 shows various three-dimensional configurations of an exemplary graphene shell according to an embodiment.
Figure 6:
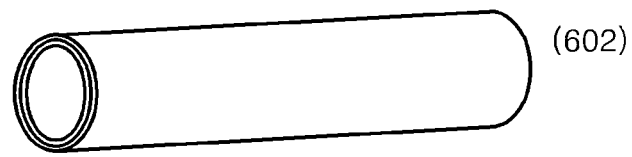
Figure 6:
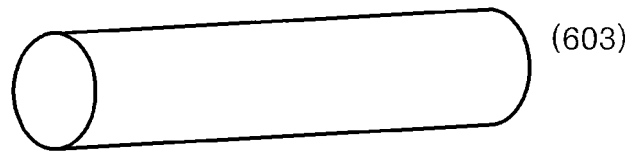
Figure 6:
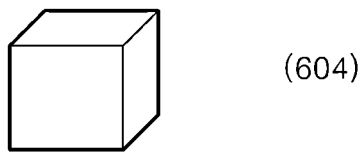
Figure 6:
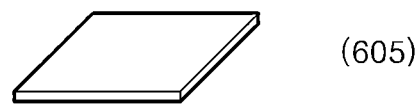
Figure 6:
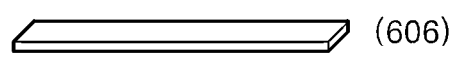

The separated graphene shell can be processed in a variety of ways according to its use as desired. That is, the graphene shell can, as illustrated in FIG. 6 have a spherical (601), polyhedral (e.g., cubic 604, square 605, or rectangular 606), cylindrical (e.g., single walled cylinder 602 or multiwalled cylinder 603) or other configuration. When the graphene shell has a spherical or polyhedral configuration, it can be used as, for example, a hydrogen storage medium. When the graphene shell has a cylindrical configuration, it can be used as, for example, an optical fiber through which light is transmitted.

A hydrogen storage medium is a system which stores hydrogen as an environmentally dean energy source for convenient and economical use. Physically, hydrogen is stored by pressing hydrogen at 100 atmospheres or greater in a high-pressure container, or by cooling hydrogen at a very low temperature, i.e., lower than the boiling point of hydrogen (20.3K). However, theses physical methods are dangerous and are not cost-effective. Chemically, hydrogen can be stored using a metallic ahoy for hydrogen storage. However, the metallic ahoy is transformed by repeated storing and discharging of hydrogen, and thus hydrogen storage capacity for such chemical systems decreases over time.

However, storing hydrogen using the graphene shell is significantly safer than conventional methods and is not dangerous as graphene adsorbs gaseous hydrogen. A large quantity of hydrogen can be stored in this way since the graphene shell has a regular structure and a large surface area. In particular, the maximum hydrogen storage efficiency for graphene is about 20% by weight, and the graphene shell is desirably not transformed (i.e., degraded) by repeated storing and discharging of hydrogen due to the dense molecular structure of the graphene.

In addition, the cylindrical graphene shell, both ends of which are open, can be used as an optical fiber. The optical fiber prepared from graphene has advantages of both a glass optical fiber and of a plastic optical fiber, without the disadvantages of each.

Since the graphene shell has flexibility and high mobility, graphene optical fibers can have low light transmission loss and high light transmission speed which are characteristics of glass optical fiber. In addition, graphene optical fibers also have flexibility and ease of handling which are characteristics of plastic optical fiber.

A process of economically preparing a graphene shell having various three-dimensional configurations, in which the thickness of the graphene shell can be controlled, is provided. The graphene shell which can have various configurations can be very effectively applied to a hydrogen storage medium, an optical fiber, or the like.

The present invention will now be described in greater detail with reference to the following examples. The following examples are for illustrative purposes only and are not intended to limit the scope of the invention.

Example 1

Figure 7:
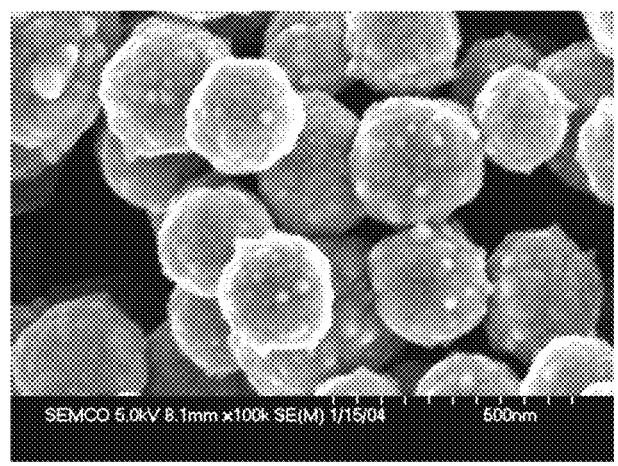
FIG. 7 shows a scanning electron microscope ("SEM") image of Ni powder used as a raw material in Example 1.
Figure 8:
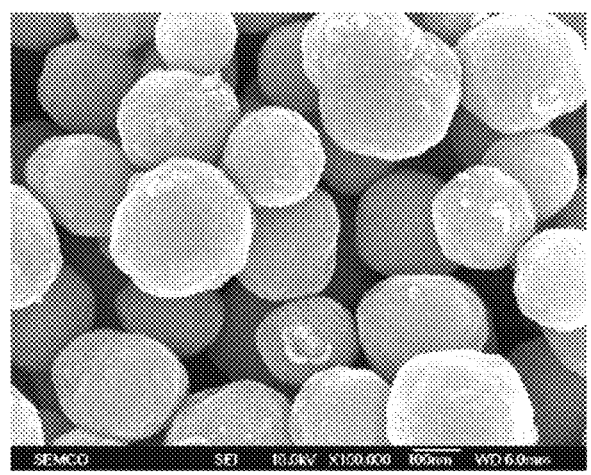
FIG. 8 shows a SEM image of the surface of powder coated with graphite after heat-treating oleic acid coated powder in Example 1.
Figure 9:
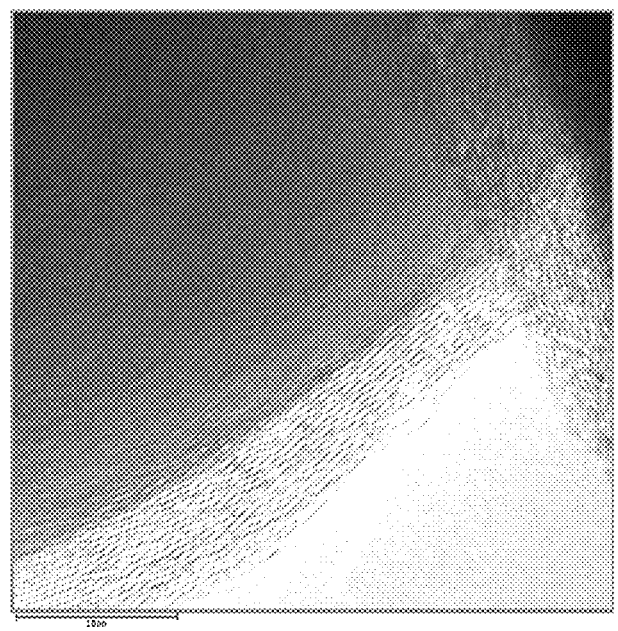
FIG. 9 shows a transmission electron microscope ("TEM") image of Ni powder prepared by heat-treatment in Example 1.
Figure 10:
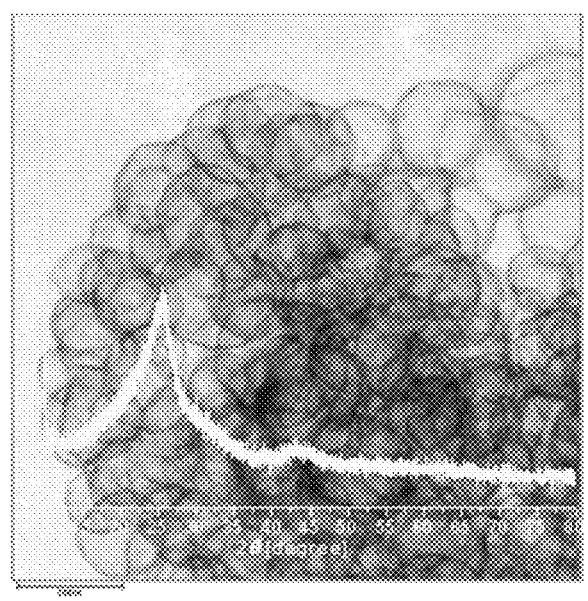
FIG. 10 shows a spherical graphene shell prepared according to Example 1.

20 kg of Ni powder having an average particle diameter of 300 μm was added to 120 kg of water. While stirring the Ni solution at 400 rpm, a mixed solution of 46.7 kg of water and 1.4 kg of oleic acid was added to the Ni solution and stirred at 400 rpm for 5 hours. When the stirring was terminated, the Ni solution in which Ni powder having oleic acid coated thereon was collected on filter paper. Vacuum was applied to the filter paper to remove water, and the Ni powder coated with the oleic acid was separated. The coated Ni powder was then heated under vacuum at 60° C. for 12 hours to remove residual water from the surface of the coated Ni powder. The dried Ni powder coated with the oleic acid was heat-treated in a nitrogen atmosphere at 500° C. to obtain graphite coated powder. FIG. 7 shows a scanning electron microscope (SEM) image of Ni powder used as the graphitizing catalyst, and FIG. 8 shows a SEM image of the surface of powder coated with graphite after heat-treating oleic acid coated powder. FIG. 9 shows a transmission electron microscope (TEM) image of the same Ni powder illustrating that 7 nm of graphene having about 20 layers was formed on the surface of NL FIG. 10 shows a spherical graphene shell prepared when the graphene coated powder was dissolved in a solution of 0.1 M HCl for 24 hours to remove the Ni.

Example 2

A spherical graphene shell was prepared in the same manner as in Example 1, except that 400 g of oleic acid was used. The thickness of the prepared graphene shell was 2 nm.

Example 3

A spherical graphene shell was prepared in the same manner as in Example 1, except that 600 g of oleic acid was used. The thickness of the prepared graphene shell was 3 nm.

Example 4

A spherical graphene shell was prepared in the same manner as in Example 1, except that 2 kg of oleic acid was used. The thickness of the prepared graphene shell was 10 nm.

According to the results of Example 1, a spherical graphene shell can be prepared with spherical Ni powder as a catalyst. In addition, according to the results of Examples 2 to 4, the thickness of graphene forming the graphene shell can be adjusted by controlling the amount of oleic acid used.

While the present invention has been particularly shown and described with reference to exemplary embodiments thereof, it will be understood by those of ordinary skill in the art that various changes in form and details can be made therein without departing from the spirit and scope of the present invention as defined by the following claims.

What is claimed is:

1. A plurality of graphene shells consisting of: graphene shells having a wall thickness of 0.1 nanometer to 7 nanometers, and
    wherein the graphene shells of the plurality are non-concentric.

2. The plurality of graphene shells of claim 1, wherein the graphene shells have a cylindrical shape and have a diameter of greater than about 1 micrometer.

3. A plurality of graphene shells consisting of:
    graphene shells which consist of a plurality of carbon atoms which are covalently bound to each other, and
    wherein the graphene shell of the plurality of graphene shells has a wall thickness of 0.1 nanometer to 7 nanometers, and
    wherein the graphene shells of the plurality are non-concentric.

4. The plurality of graphene shells of claim 3, wherein the graphene shell has a cylindrical shape and has a diameter of greater than about 1 micrometer.

5. A plurality of graphene shells consisting of:
    graphene shells which consist of a plurality of carbon atoms which are covalently bound to each other,
    wherein the graphene shells have a cylindrical configuration with a diameter greater than about 1 micrometer, and
    wherein the graphene shells of the plurality are non-concentric.

6. A plurality of graphene core-shell assemblies consisting of:
    a plurality of three-dimensional bodies each comprising at least one selected from the group consisting of a graphitizing catalyst and a core; and
    a graphene shell formed on a surface of the three-dimensional bodies,
    wherein the graphene shell has a wall thickness of 0.1 nanometer to 7 nanometers, and
    wherein the core comprises a metal oxide.

7. The plurality of graphene core-shell assemblies of claim 6, wherein the three-dimensional body comprises a core and a graphitizing catalyst shell.

8. The plurality of graphene core-shell assemblies of claim 6, wherein the graphene shell has a cylindrical shape and has a diameter of greater than about 1 micrometer.

9. A plurality of graphene core-shell assemblies consisting of:
    a plurality of three-dimensional bodies each comprising a graphitizing catalyst on a surface of a core; and
    a graphene shell on a surface of a three-dimensional body of the plurality of three-dimensional bodies, wherein the graphene shell has a wall thickness of 0.1 nanometer to 7 nanometers.

10. The plurality of graphene core-shell assemblies of claim 9, wherein the core comprises a metal oxide.

11. The plurality of graphene core-shell assemblies of claim 9, wherein the graphitizing catalyst comprises a metal.

12. The plurality of graphene core-shell assemblies of claim 11, wherein the metal of the graphitizing catalyst is selected from Ni, Co, Fe, Pt, Au, Al, Cr, Cu, Mg, Mn, Mo, Rh, Si, Ta, Ti, W, U, V, and Zr.

13. The plurality of graphene core-shell assemblies of claim 9, wherein the graphene shell has a cylindrical shape and has a diameter of greater than about 1 micrometer.

* * * * *